(12) United States Patent  (10) Patent No.: US 8,329,323 B2
Atkinson et al.  (45) Date of Patent: Dec. 11, 2012

(54) BATTERY PACK HEAT TRANSFER

(75) Inventors: Lee Atkinson, Taipei (TW); Darien Chen, Hsinchu (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 1650 days.

(21) Appl. No.: 11/669,494

(22) Filed: Jan. 31, 2007

(65) Prior Publication Data

US 2008/0182156 A1 Jul. 31, 2008

(51) Int. Cl.
*H01M 10/50* (2006.01)

(52) U.S. Cl. .......................... 429/50; 429/120

(58) Field of Classification Search .................. 429/50, 429/120; 361/688
See application file for complete search history.

(56) References Cited

U.S. PATENT DOCUMENTS

| 4,999,576 | A | 3/1991 | Levinson |
| 5,187,030 | A | 2/1993 | Firmin et al. |
| 5,229,702 | A | 7/1993 | Boehling et al. |
| 5,343,368 | A | 8/1994 | Miller |
| 6,010,800 | A | 1/2000 | Stadnick et al. |
| 6,933,076 | B2 * | 8/2005 | Ura et al. ............. 429/164 |
| 2001/0051298 | A1 * | 12/2001 | Hanafusa et al. ........ 429/162 |
| 2003/0017383 | A1 * | 1/2003 | Ura et al. ............. 429/120 |
| 2003/0082439 | A1 | 5/2003 | Sakakibara |
| 2003/0232229 | A1 | 12/2003 | Bergqvist |

* cited by examiner

*Primary Examiner* — Jennifer Michener
*Assistant Examiner* — Monique Wills

(57) ABSTRACT

A battery pack for thermal conduction of heat from a battery cell to a portable computer system is described. The battery pack comprises a housing, a battery cell within the housing, at least one electrode, and a thermal transfer contact separate from the at least one electrode. The thermal transfer extends through the housing and transfers heat from the battery cell to external of the battery pack.

13 Claims, 6 Drawing Sheets

BATTERY PACK HEAT TRANSFER

BACKGROUND

Battery packs provide power to portable computer systems, e.g., laptops, notebooks, palmtops, etc. Battery packs may be used to provide power during periods when main power, such as alternating current (AC) power, may be unavailable. In many instances, battery packs are retained within the connected computer system, e.g., inserted into a cavity in the portable computer system.

During and after use, e.g., charging and discharging, battery packs generate heat which may decrease performance and reliability of the battery packs.

FIG. 1 depicts a side section schematic diagram of a portion of a portable computer system 100 comprising a computer housing 101 forming a cavity 102 for receiving a battery pack 104. Battery pack 104 comprises a housing 106, e.g., a plastic shell, enclosing a battery cell 108, e.g., an electrochemical cell. For orientation purposes, an upper surface of housing 106 is the portion closest to the top of the page and a lower surface is the portion closest to the bottom of the page. Heat generated by battery pack 104 generally rises from the bottom of the page toward the top of the page. Battery cell 108 is positioned in battery pack 104 and prevented from moving within the pack through the application of four positioning members 110, e.g., glue or silicone portions, between the cell and the pack. A pair of electrodes 112 extend from battery cell 108 to an outer surface of housing 106 in order to contact a pair of contacts 114 in cavity 102 to transfer an electric charge to/from the battery cell. An air gap 116 separates battery cell 108 from housing 106 and acts as an insulator to retain heat within housing 106. An additional air gap is formed between cavity 102 walls and battery pack 104 to facilitate user removal.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

Figure 2:
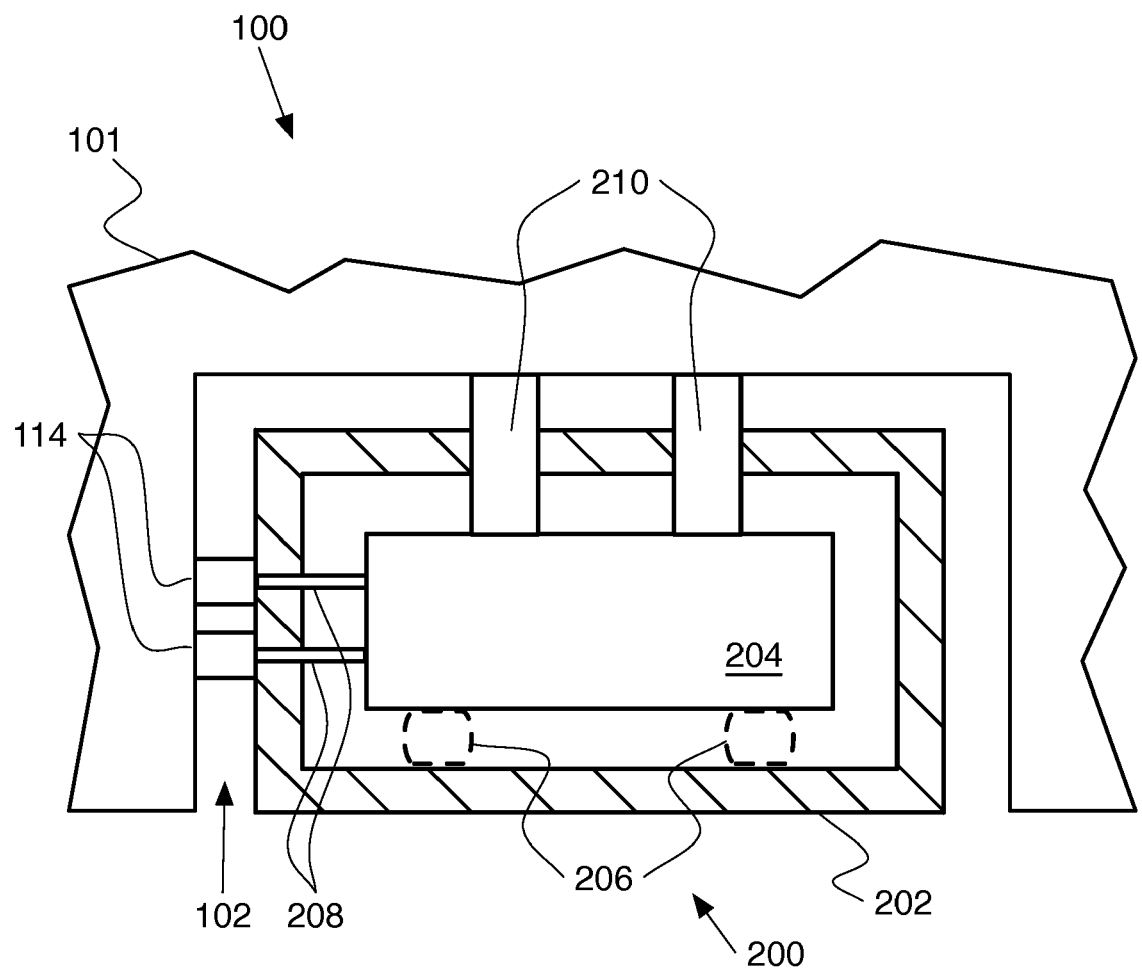
FIG. 2 is a side section schematic diagram of a battery pack according to an embodiment positioned in a computer.

FIG. 2 depicts a side section schematic diagram of portable computer system 100 and a battery pack 200 according to an embodiment positioned within cavity 102 of the portable computer system. Battery pack 200 comprises a housing 202 (battery housing) enclosing a battery cell 204, e.g., an electrochemical storage cell and a pair of optional positioning members 206 (dashed line), e.g., glue or silicone portions, between a lower surface of battery cell 204 and an inner surface of housing 202 maintain the battery cell in position within the housing. Battery pack 200 further comprises a pair of electrodes 208 extending from battery cell 204 to an outer surface of housing 202 in order to contact the pair of contacts 114 in cavity 102 to transfer an electric charge to/from the battery cell.

Battery pack 200 further comprises a pair of thermal transfer contacts 210 extending from battery cell 204 to beyond housing 202 in order to contact a surface of cavity 102 of the portable computer system 100. Thermal transfer contacts 210 comprise a thermal transfer material, e.g., a metal, a plastic, etc. Thermal transfer contacts 210 conduct heat from battery cell 204 through housing 202 to portable computer system 100. Thermal transfer contacts 210 provide a pathway for heat to transfer away from battery cell 204 because the contacts provide a lower resistance conductive path for the heat in comparison to housing 202 and the air gap between the battery cell and the battery housing.

In some embodiments, a single thermal transfer contact may be used in place of the pair of thermal transfer contacts 210. In some embodiments, more than two thermal transfer contacts may be used in place of the pair of thermal transfer contacts 210.

As depicted in FIG. 2, thermal transfer contacts 210 extend toward an upper surface of battery pack 202 to contact a lower surface of portable computer system 100. In this manner, the surface area of portable computer system 100 may be used to dissipate the heat generated by battery cell 204. That is, the heat of battery cell 204 is transferred to the body of portable computer system 100.

In some embodiments, thermal transfer contacts 210 may extend through housing 202 horizontally at one or more sides of battery pack 200 to contact a surface of cavity 102.

In some embodiments, one set of thermal transfer contacts 210 extend horizontally and another set of thermal transfer contacts 210 extend vertically to contact cavity 102.

Figure 3:
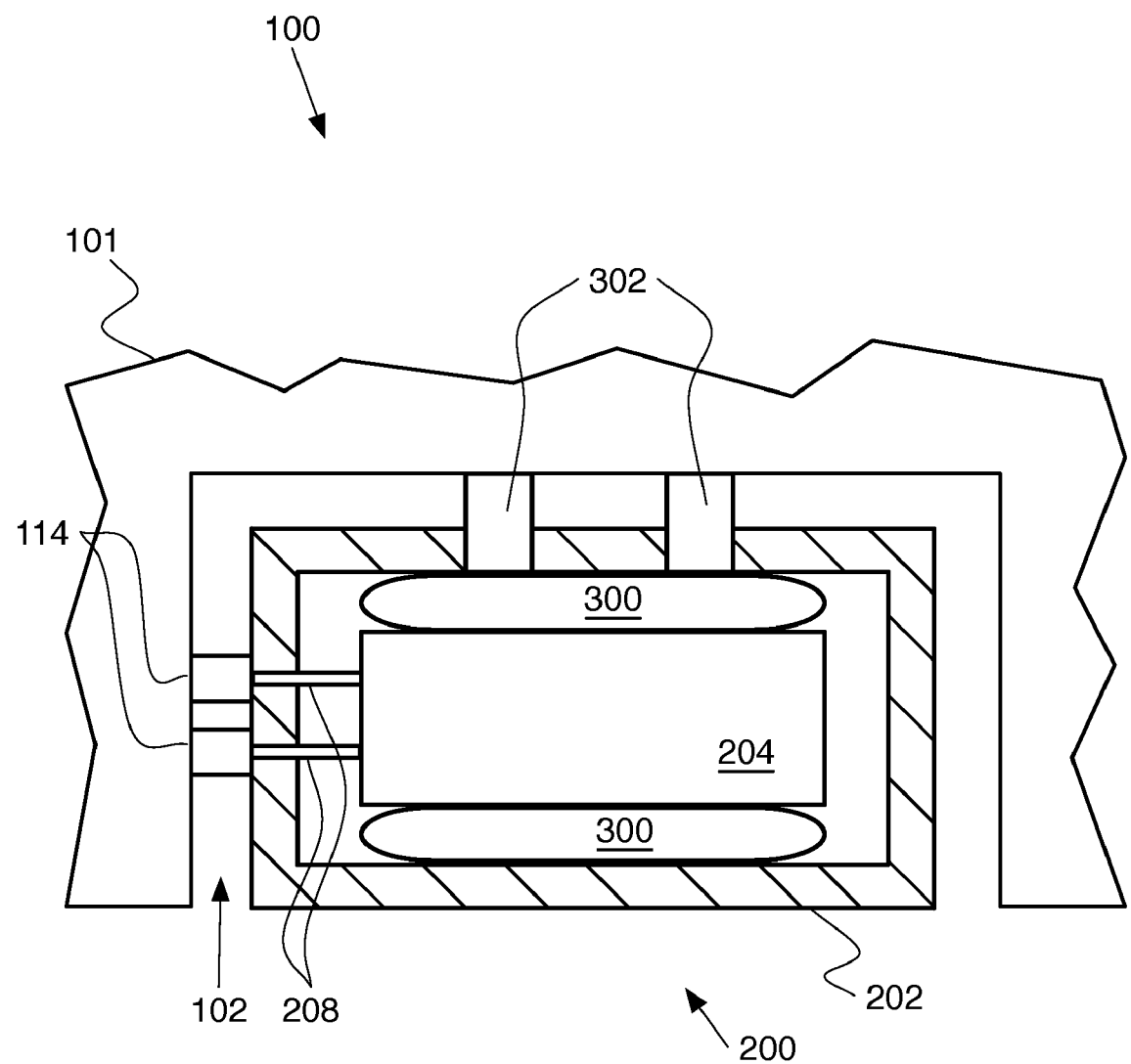
FIG. 3 is a side section schematic diagram of a battery pack according to another embodiment positioned in a computer.

FIG. 3 depicts another embodiment of battery pack 200 in which a thermally conductive substance, e.g., a thermal paste 300, is applied between an outer face of battery cell 204 and an inner face of housing 202. Thermal paste 300 conducts heat from battery cell 204 to battery pack housing 202.

Figure 1:
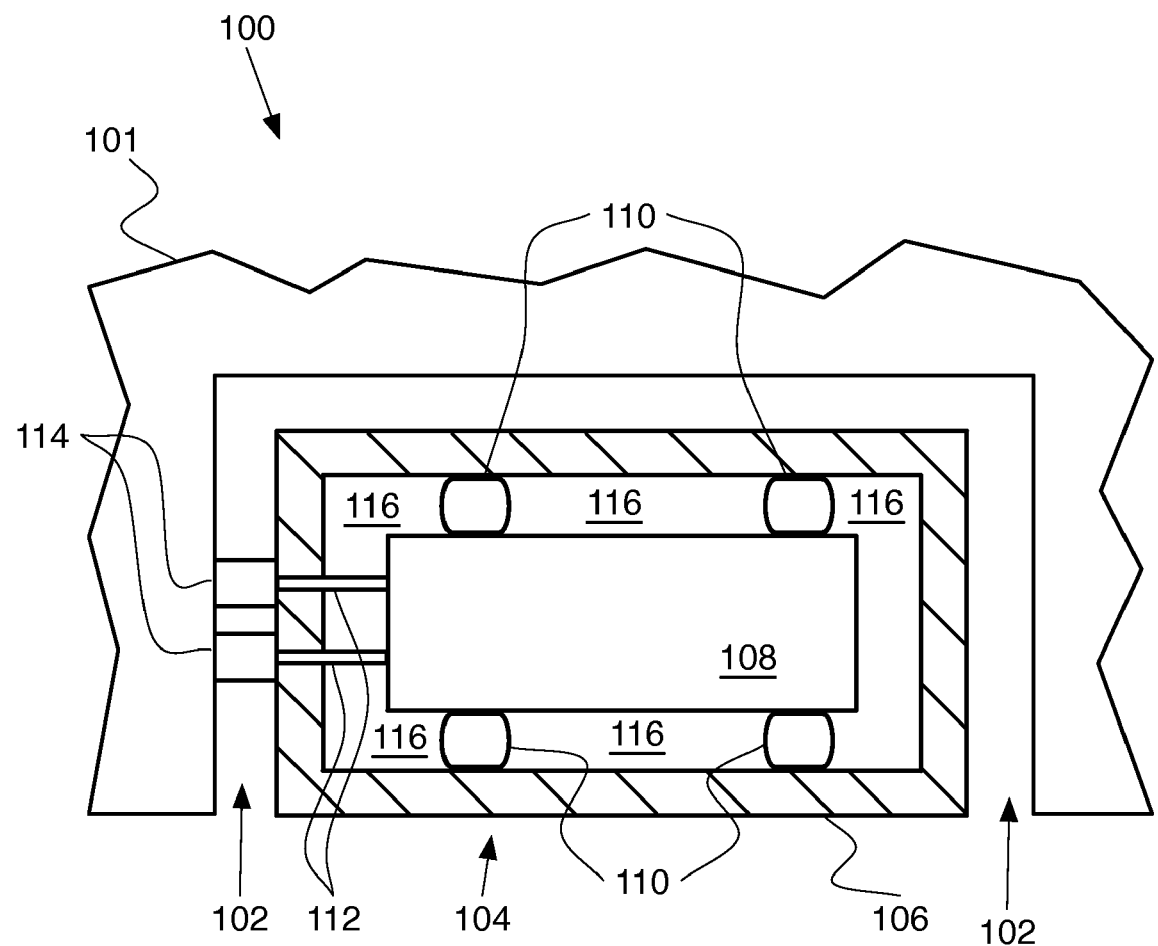
FIG. 1 is a side section schematic diagram of a battery pack positioned in a computer.

As depicted, thermal paste 300 is applied to an upper and lower face of battery cell 204. In some embodiments, thermal paste 300 may be applied to an upper face of battery cell 204 and direct contact may be made between the lower face of battery cell 204 and inner face of housing 202. In at least one other embodiment, thermal paste 300 may be applied to an upper face of battery cell 204 and at least one positioning member is placed between the lower face of the battery cell and the inner face of housing 202. In at least one other embodiment, thermal paste 300 may be applied to at least one side face of battery cell 204 to contact housing 202. In at least one further embodiment, thermal paste 300 may be applied to an upper face of battery cell 204 and an air gap, similar to air gap 116 (FIG. 1) may be maintained between battery cell 204 and housing 202 for the remainder of the exterior of the battery cell lacking thermal paste.

In the FIG. 3 embodiment, battery pack 200 further comprises a pair of thermal transfer contacts 302, similar to thermal transfer contacts 210 (FIG. 2), in contact with thermal paste 300 and extending through housing 202 to contact portable computer system 100, e.g., by contact with a surface of cavity 102. In this manner, thermal paste 300 transfers heat from a larger surface area of battery cell 204 to thermal transfer contacts 302. In some embodiments, thermal paste 300 may serve to position battery cell 204 within housing 202. In some embodiments, thermal transfer contacts 210 extend partially into thermal paste 300. In some embodiments, thermal transfer contacts 210 extend through thermal paste 300 to contact with the surface of battery cell 204.

Figure 4:
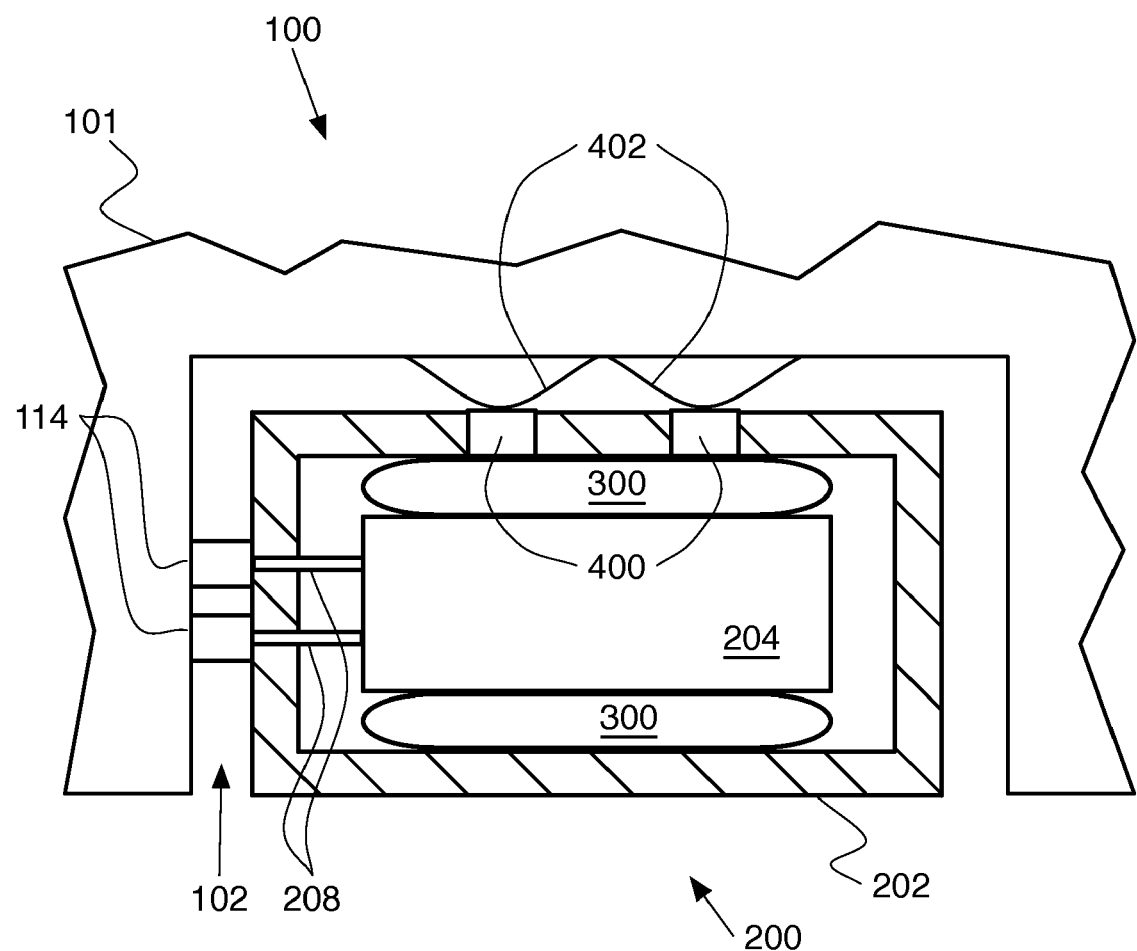
FIG. 4 is a side section schematic diagram of a battery pack according to another embodiment positioned in a computer.

FIG. 4 depicts another embodiment of battery pack 200 in which thermal paste 300 is applied to an upper and lower face of battery cell 204. The battery pack further comprises a pair of thermal transfer contacts 400 to transfer heat from battery cell 204 via thermal paste 300 to a pair of compressible contacts 402 connected to a surface of cavity 102 of the portable computer system 100. Compressible contacts 402 comprise a thermally conductive material to transfer heat from thermal transfer contacts 400 to portable computer system 100. In some embodiments, compressible contacts 402 may be a leaf spring, coil spring, spiral spring, cantilever spring, or other type of compressible device for contacting the thermal transfer contacts. Changes in positioning of battery pack 200 within cavity 102 may be accounted for by the use of compressible contacts 402. In some embodiments, compressible contacts 402 are molded/formed as a part of computer housing 101, e.g., springs may be formed as a part of the computer housing. In some embodiments, compressible contacts 402 comprise metal springs riveted to computer housing 101.

In some embodiments, a single compressible contact may be used in place of a pair of compressible contacts. In some embodiments, more than two compressible contacts may be used. In some embodiments, there may be more compressible contacts than thermal transfer contacts in battery pack 200. In some embodiments, there may be more thermal transfer contacts in battery pack 200 than compressible contacts 402 in cavity 102.

Compressible contacts 402 are positioned to align with a corresponding number of thermal transfer contacts 400 in battery pack 200. In some embodiments, compressible contacts 402 may be positioned on the side surfaces of cavity 102.

Figure 5:
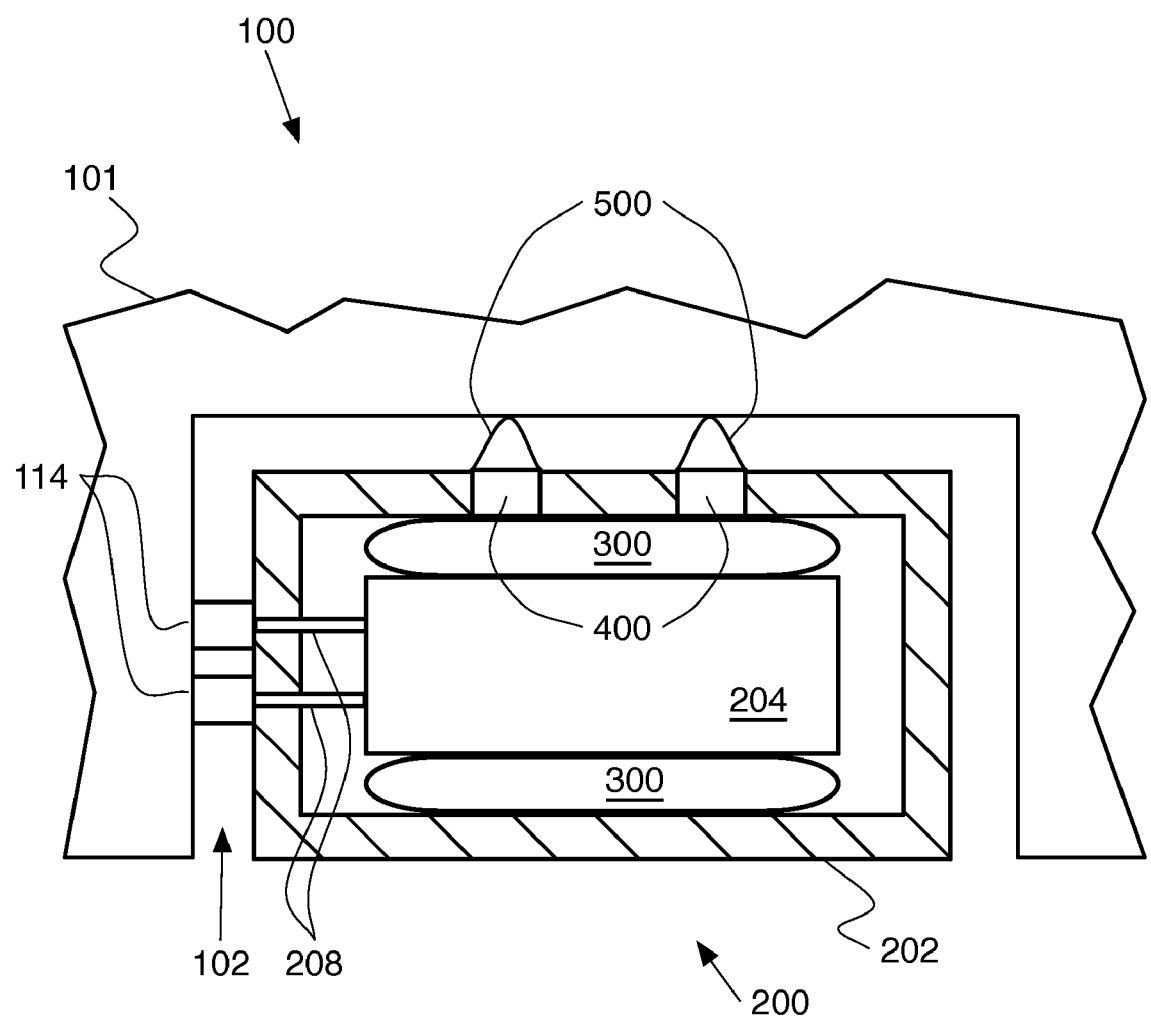
FIG. 5 is a side section schematic diagram of a battery pack according to another embodiment positioned in a computer.

FIG. 5 depicts another embodiment of battery pack 200 in which thermal paste 300 is applied to an upper and lower face of battery cell 204 and the pair of thermal transfer contacts 400 extending through housing 202 to transfer heat from the battery cell via the thermal paste. A pair of compressible contacts 500 are connected to a corresponding thermal transfer contact 400 on the outer surface of housing 202. Compressible contacts 500 comprise a thermally conductive material to transfer heat from thermal transfer contacts 400 to portable computer system 100. In some embodiments, compressible contacts 500 may be a leaf spring, coil spring, spiral spring, cantilever spring, or other type of compressible device for contacting the portable computer system 100.

In some embodiments, compressible contact 500 may be connected to housing 202 and arranged to contact an upper surface of thermal transfer contact 400.

Figure 6:
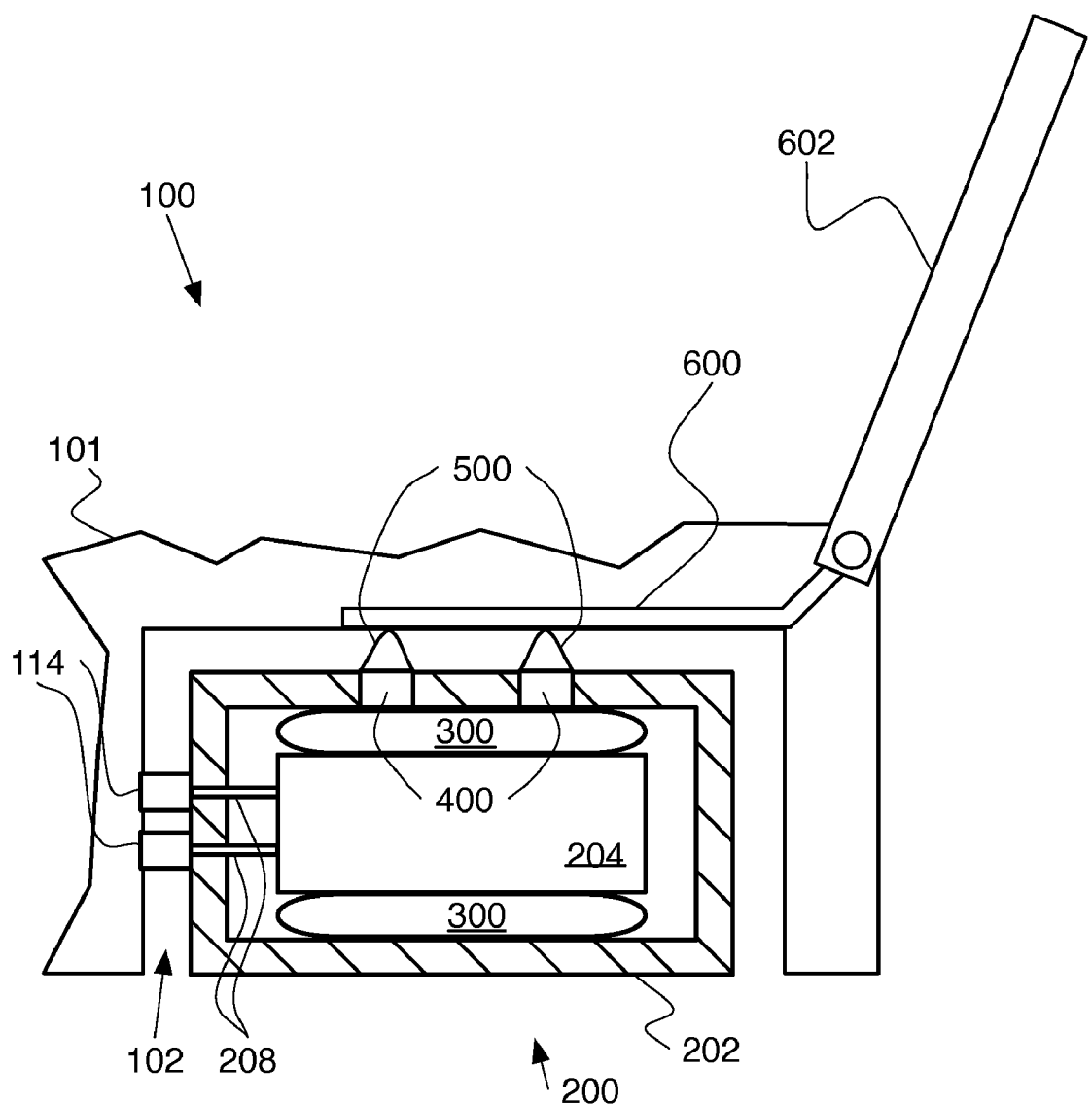
FIG. 6 is a side section schematic diagram of a battery pack according to another embodiment positioned in a computer.

FIG. 6 depicts another embodiment of battery pack 200 in which portable computer system 100 further comprises a conducting strip 600 positioned to contact compressible contacts 500. In some embodiments, conducting strip 600 may be formed as part of the surface of cavity 102. Conducting strip 600 transfers heat from battery pack 200 via compressible contacts 500 to a display 602 connected to portable computer system 100. Display 602 comprises a thermally conductive material in order to radiate heat transferred from battery pack 200.

What is claimed is:

1. A battery pack for thermal conduction of heat to a portable computer system, comprising:
    a housing;
    a battery cell within the housing;
    at least one electrode extending from the battery cell through the housing;
    a thermal transfer contact, separate from the at least one electrode, extending from the battery cell and through the housing of the battery pack and arranged to transfer heat from the battery cell to a body of the portable computer system that is external to the battery pack; and
    a compressible contact in contact with the thermal transfer contact and arranged to transfer heat from the thermal transfer contact to the body of the portable computer system.

2. The battery pack as claimed in claim 1, wherein the thermal transfer contact has a lower thermal transfer resistance than the housing.

3. The battery pack as claimed in claim 1, wherein a surface area of the portable computer system dissipates heat generated by the battery cell and transferred through the thermal transfer contact.

4. The battery pack as claimed in claim 1, wherein the compressible contact is connected to the thermal transfer contact.

5. The battery pack as claimed in claim 1, wherein the compressible contact is connected to the housing.

6. The battery pack as claimed in claim 1, wherein the thermal transfer contact extends through an upper surface of the housing.

7. The battery pack as claimed in claim 1, wherein the compressible contact includes a spring.

8. The battery pack as claimed in claim 1, wherein the body of the portable computer system is a display, and wherein the thermal transfer contact is arranged to transfer heat from the battery cell to the display through the compressible contact.

9. The battery pack as claimed in claim 1, wherein the thermal transfer contact extends through the housing of the battery pack in a direction to transfer heat from the battery cell to a surface defining a cavity of the portable computer system, the cavity to receive the battery pack.

10. The battery pack as claimed in claim 9, wherein the direction is a vertical direction.

11. The battery pack as claimed in claim 1, further comprising another thermal transfer contact, separate from the at least one electrode, extending from the battery cell and through the housing to the body of the portable computer system.

12. The battery pack as claimed in claim 1, wherein the thermal transfer contact is contacted to the battery cell.

13. The battery pack as claimed in claim 1, wherein the at least one electrode is to contact at least one electrode contact of the portable computer system.

* * * * *